(12) United States Patent
Sato et al.

(10) Patent No.: US 8,371,345 B2
(45) Date of Patent: Feb. 12, 2013

(54) FUEL LID PART STRUCTURE

(75) Inventors: Yu Sato, Shioya-Gun (JP); Shoichi Hokazono, Utsunomiya (JP); Shinya Murabayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 12/675,055

(22) PCT Filed: Aug. 8, 2008

(86) PCT No.: PCT/JP2008/064296
§ 371 (c)(1),
(2), (4) Date: Feb. 24, 2010

(87) PCT Pub. No.: WO2009/031382
PCT Pub. Date: Mar. 12, 2009

(65) Prior Publication Data
US 2011/0017738 A1    Jan. 27, 2011

(30) Foreign Application Priority Data
Sep. 7, 2007   (JP) .................................. 2007-232944

(51) Int. Cl.
*B65B 1/04*   (2006.01)

(52) U.S. Cl. ...................... 141/350; 220/86.2; 296/97.22

(58) Field of Classification Search .......... 141/348–350, 141/386; 220/86.2; 296/97.22
See application file for complete search history.

(56) References Cited

U.S. PATENT DOCUMENTS

| | | | |
|---|---|---|---|
| 4,946,060 A | 8/1990 | Sherwood et al. | |
| 5,992,670 A | 11/1999 | Hagano et al. | |
| 6,155,316 A | 12/2000 | Benjey | |
| 6,446,826 B1 | 9/2002 | Foltz et al. | |
| 6,918,504 B2 | 7/2005 | Miura et al. | |
| 7,011,121 B2 | 3/2006 | Bar et al. | |
| 7,089,977 B2 * | 8/2006 | Davis | 141/392 |
| 7,246,642 B2 * | 7/2007 | Foltz et al. | 141/350 |
| 7,311,348 B1 * | 12/2007 | Bang | 296/97.22 |
| 7,647,955 B2 * | 1/2010 | Murabayashi et al. | 141/301 |
| 2006/0060581 A1 | 3/2006 | Foltz et al. | |
| 2007/0125444 A1 | 6/2007 | Hagano et al. | |
| 2009/0095373 A1 * | 4/2009 | Correira et al. | 141/350 |

FOREIGN PATENT DOCUMENTS

| | | |
|---|---|---|
| DE | 198 27 194 A1 | 12/1999 |
| JP | 61-190724 U | 11/1986 |
| JP | 3057724 A | 3/1991 |
| JP | 6-033720 U | 5/1994 |
| JP | 10-329860 | 12/1998 |
| JP | 2002-211256 A | 7/2002 |
| JP | 2004-009789 A | 1/2004 |

(Continued)

*Primary Examiner* — Timothy L Maust
*Assistant Examiner* — Timothy Kelly
(74) *Attorney, Agent, or Firm* — Carrier Blackman & Associates, P.C.; William D. Blackman; Joseph P. Carrier

(57) ABSTRACT

A structure for a fuel lid section has a fuel lid supported on a vehicle body via a hinge, a vehicle body recess openably covered by the fuel lid, a fuel filling opening placed in the vehicle body recess, and a cap-less mechanism provided at the fuel filling opening and enabling fuel filling operation without requiring attachment/detachment of a fuel cap. The structure also has an electricity conduction path extending from the fuel lid to the vehicle body.

5 Claims, 2 Drawing Sheets

FOREIGN PATENT DOCUMENTS

| | | |
|---|---|---|
| JP | 2007-153049 A | 6/2007 |
| TW | 448111 B | 8/2001 |
| TW | M300642 U | 11/2006 |
| WO | 2006-090117 A1 | 8/2006 |

* cited by examiner

FUEL LID PART STRUCTURE

TECHNICAL FIELD

The present invention relates to a fuel lid part structure of a vehicle such as an automobile.

Priority is claimed on Japanese Patent Application No. 2007-232944, the contents of which are incorporated herein by reference.

BACKGROUND ART

Conventionally, a fuel lid part structure is known in which a fuel cap attached to a filler opening is formed of conductive material and static electricity charged to a body of an oil-filling operator is discharged to a vehicle body during an operation for opening or closing the fuel cap (for example, see Patent Document 1).

Meanwhile, in a recent vehicle, in order to simplify the oil-filling operation, there is a case in which a capless mechanism which does not need attaching and detaching of the fuel cap is employed (for example, see Patent Document 2).

[Patent Document 1] Japanese Patent No. 3389850
[Patent Document 2] U.S. Pat. No. 7,011,121

DISCLOSURE OF INVENTION

Problems that the Invention is to Solve

However, when employing the capless mechanism, there is a problem in that a countermeasure against static electricity using the above fuel cap can not be used.

The present invention was made in view of the above-mentioned circumstance and has an object of providing a fuel lid part structure capable of discharging the static electricity charged to the body of the oil-filling operator through an earth even when using the capless mechanism which does not need attaching and detaching of the fuel cap.

Means of Solving the Problems

In order to solve the above-described problem, (1) a fuel lid part structure of the present invention is provided with: a fuel lid which is supported to a vehicle body with a hinge interposed therebetween; a vehicle-body concave portion which is covered by the fuel lid so as to be openable or closable; a filler opening which is disposed in the vehicle-body concave portion; and a capless mechanism which is provided in the filler opening so as to perform an oil-filling operation which does not need attaching and detaching of the fuel cap, wherein a conductive passage is provided from the fuel lid to the vehicle body.

(2) At least a rear-surface end portion of the fuel lid may be formed of a conductive resin.

(3) An adaptor forming the vehicle-body concave portion may be formed so as to be separated from the vehicle body, and the adaptor may be formed of a conductive resin.

(4) A conductive packing interposed between the filler opening and the adaptor may be further provided.

(5) The fuel lid may include a locking mechanism and may open from a full-close state to a half-open state in which the vehicle-body concave portion is opened for a predetermined degree of opening, when a locking of a lock mechanism is released.

(6) The capless mechanism may be formed so as to pass through a through-hole formed in a bottom portion of the adaptor, and flexible packing may be interposed between the through-hole and an outer periphery of the capless mechanism.

(7) The capless mechanism may include a cylindrical main body fitted to a front end portion of a tubular filler neck extending from a fuel tank, and an inner lid rotatably supported to an inside of the cylindrical main body via a hinge shaft which is perpendicular to an axis of the cylindrical main body, and the inner lid may closely contact with a peripheral portion of a front-end opening of the cylindrical main body from the inside of the cylindrical main body by a predetermined force by the hinge shaft.

(8) The packing may have an electrical conductivity.

Advantageous Effects of Invention

According to the invention described in (1), when the fuel lid is manually opened by a hand after releasing a locking of the fuel lid, static electricity charged to a body of the oil-filling operator is discharged to the vehicle body. Accordingly, even when using the capless mechanism which does not need attaching and detaching of the fuel cap, it is possible to surely discharge the static electricity charged to the body of the oil-filling operator through an earth.

According to the invention described in (2), the fuel lid is formed of resin which has a good formability and it is possible to discharge the static electricity through the earth during the oil-filling operation. In case that the fuel lid formed steel having coating is not conductive, the rear-surface end portion of the fuel lid directly contacting with the oil-filling operator is formed of the conductive resin, and the conductive passage is provided from the rear-surface end portion to the vehicle body, it is possible to surely discharge the static electricity through the earth during the oil-filling operation. Also, it is possible to improve a tactile sensation during opening the fuel lid.

According to the invention described in (3), since the adaptor is formed of resin which has a good formability, the adaptor and the fuel lid form into an assembly, it is possible to discharge the static electricity through the earth during the oil-filling operation.

According to the invention described in (4), since it is possible to maintain the filler opening and the vehicle body at the same potential via the packing, it is possible to more surely discharge the static electricity through the earth.

DESCRIPTION OF THE REFERENCE SYMBOLS

1: VEHICLE
2: VEHICLE BODY
3: FILLER OPENING
4: VEHICLE-BODY CONCAVE PORTION
5: FUEL LID
5a: REAR-SURFACE END PORTION
6: HINGE
9: ADAPTOR
15: CAPRESS MECHANISM
23: PACKING

BEST MODE FOR CARRYING OUT THE INVENTION

Hereinafter, an exemplary embodiment of the invention will be described with reference to the accompanying drawings.

Figure 1:
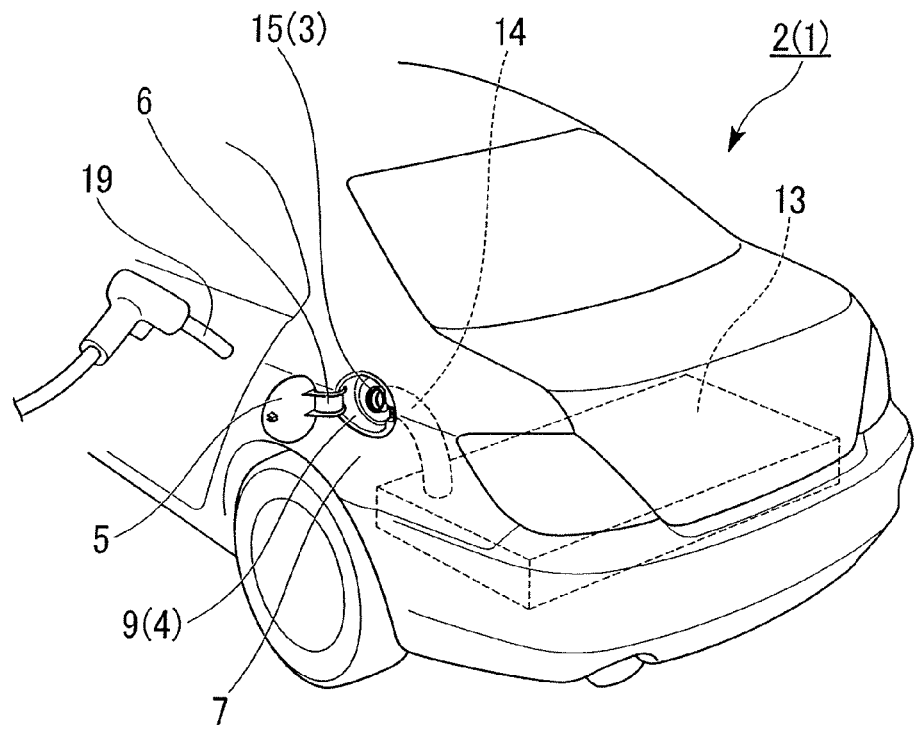
FIG. 1 is a perspective view showing a rear part of a vehicle body according to an embodiment of the invention.

As shown in FIG. 1, a fuel lid 5 is provided, for example, at a position on the left rear part of a vehicle body 2 of a vehicle 1 so as to cover a vehicle-body concave portion 4 provided with a filler opening 3.

A front end side of the fuel lid 5 is supported to the vehicle body 2 with a hinge 6 interposed therebetween. The fuel lid 5 is rotatable between a full-close state in which the outer surface thereof is located at the same level of an outer surface of the vehicle body 2 so as to close the vehicle-body concave portion 4 and a full-open state in which the fuel lid 5 is opened in nearly perpendicular direction to the outer surface of the vehicle body 2 so as to open the vehicle-body concave portion 4.

When the fuel lid 5 is in the full-close state, the rear end side of the fuel lid 5 is engaged with and locked to a lock mechanism (not shown in the figures) so as to maintain the full-close state. When a routine lock release operation is carried out in this state, the locking is released and the fuel lid 5 becomes rotatable so as to be in the full-open state.

When the lock is released, the fuel lid 5 opens from the full-close state to a half-open state in which the vehicle-body concave portion 4 is opened for a predetermined degree of opening by a predetermined force. When a rear-surface end portion 5a (see FIGS. 3 and 4) of the fuel lid 5 is pulled outward by a hand in this state, the fuel lid 5 is manually rotated to the full-open state.

Figure 3:
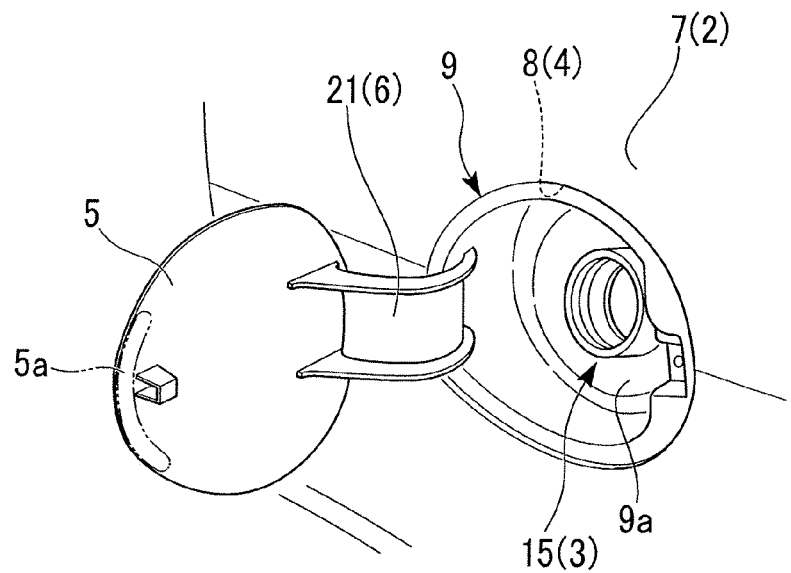
FIG. 3 is a perspective showing the periphery of a fuel lid of the vehicle.
Figure 4:
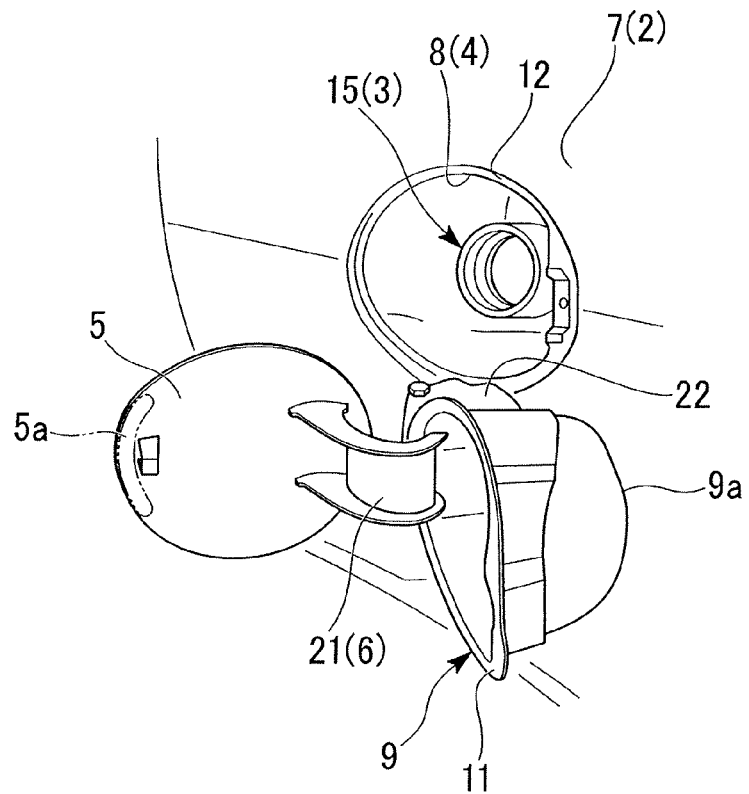
FIG. 4 is an exploded perspective view showing the periphery of the fuel lid.

As shown in FIG. 3 and FIG. 4, the vehicle-body concave portion 4 mainly includes an opening 8 formed in an outer plate member 7 on the left rear part of the vehicle body 2 and an adaptor 9 formed in the opening 8 so as to be concave toward a vehicle inside.

The adaptor 9 is formed so as to be separated from the vehicle body 2 and has a cup shape opened to a vehicle outside; and a flange portion 11 is formed in an outer periphery of the opening. Meanwhile, a stepped portion 12 is formed in a peripheral portion of the opening 8 of the outer plate member 7 so that the peripheral portion is lowered to the vehicle inside. When the flange portion 11 fits with the stepped portion 12 in a contact state from the vehicle outside and is arbitrarily attached thereto by a screw etc., the adaptor 9 is integrally mounted to the vehicle body 2.

Figure 2:
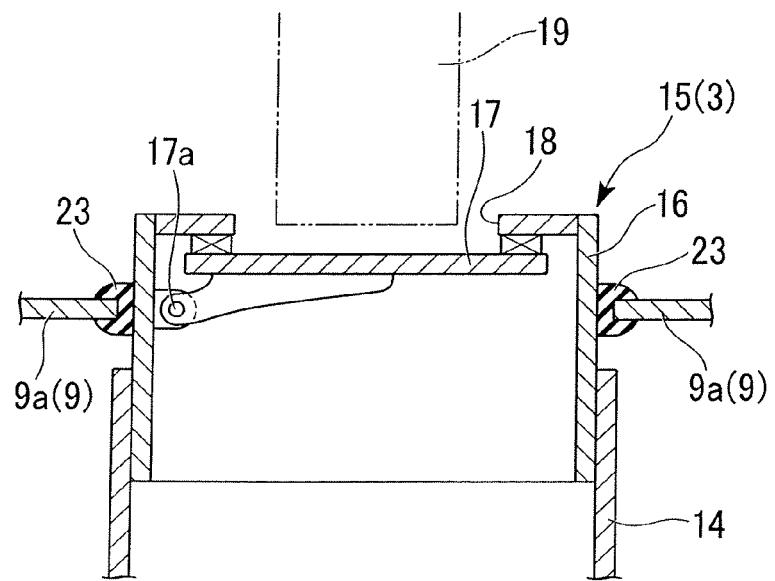
FIG. 2 is a sectional view showing the periphery of a filler opening of the vehicle.

As shown in FIG. 1 and FIG. 2, the filler opening 3 mainly includes, for example, a front end portion of a tubular filler neck 14 extending from a fuel tank 13 mounted to a lower portion of the vehicle body 2 and a capless mechanism 15 integrally mounted to the front end portion.

The front end portion of the filler neck 14 is located at a position adjacent to a bottom portion 9a of the adaptor 9, and the capless mechanism 15 extending from the front end portion is formed so as to pass through the bottom portion 9a of the adaptor 9 from the inside toward the outside of the vehicle. An outer periphery of the capless mechanism 15 is supported by a through-hole of the bottom portion 9a of the adaptor 9 with a flexible packing 23 interposed therebetween in a sealed state.

The capless mechanism 15 mainly includes a cylindrical main body 16 fitted and mounted to the front end portion of the filler neck 14 and an inner lid 17 rotatably supported to an inside of the cylindrical main body 16 with a hinge shaft 17a interposed therebetween, the hinge shaft 17a being perpendicular to the axis of the cylindrical main body 16.

The inner lid 17 closely contacts with a peripheral portion of a front-end opening 18 of the cylindrical main body 16 by a predetermined force from the inside of the main body 16 so that the front-end opening 18 is closed in a sealed state. When the external oil-filling device inserts an oil-filling nozzle 19 into the front-end opening 18, a front end portion of the oil-filling nozzle 19 pushes the inner lid 17 to the inside of the cylindrical main body 16 so that the front-end opening 18 is opened, thereby performing an oil-filling operation via the oil-filling nozzle 19. When the oil-filling nozzle 19 is pulled out from the capless mechanism 15 after the oil-filling operation, the front-end opening 18 is automatically closed by the inner lid 17 by a predetermined force.

That is, since it is not necessary to attach or detach a fuel cap after the fuel lid 5 is manually opened, it is possible to perform the oil-filling operation just by inserting the oil-filling nozzle 19 thereinto.

Here, the fuel lid 5 is formed of a conductive resin, for example, including carbon powders or SUS fibers.

As shown in FIG. 3 and FIG. 4, on the front end side of the fuel lid 5, the fuel lid 5 is integrally formed with a hinge arm 21 extending from a hinge shaft (not shown in the figures) of the hinge 6 to the fuel lid 5. That is, the fuel lid 5 and the hinge arm 21 are integrally formed of the same conductive resin.

The adaptor 9 is formed of, for example, the same conductive resin as the fuel lid 5, and the adaptor 9 is integrally formed with a hinge base 22 corresponding to a fixed portion of the hinge 6 on the side of the vehicle body 2 at the front end portion of the fuel lid 5. That is, the hinge base 22 is a part of the adaptor 9 and is integrally formed of the same conductive resin with the adaptor 9.

The hinge arm 21 is integrally connected to the hinge base 22 as the hinge shaft formed of steel interposed therebetween, and the fuel lid 5, the hinge 6, and the adaptor 9 are handled as a single assembly. As described above, when the adaptor 9 is attached to the vehicle body 2, it is possible to mount the fuel lid 5 to the vehicle body 2 so as to be openable or closable.

In this case, since the fuel lid 5 and the adaptor 9 are formed of the conductive resin, a conductive passage from the fuel lid 5 to the vehicle body 2 is established in a fuel lid part of the vehicle 1.

Accordingly, when the fuel lid 5 is manually opened by a hand after releasing the locking of the fuel lid 5 in a case where static electricity is charged to a body of an oil-filling operator, it is possible to discharge the static electricity to the vehicle body 2 via the fuel lid 5, the hinge 6, and the adaptor 9. In other words, the conductive passage is formed of the fuel lid 5, hinge 6 and the adaptor 9.

Since the packing 23 is formed of conductive rubber material, for example, including carbon powders or SUS fibers, and the filler opening 3 having the capless mechanism 15 is maintained at the same potential as the vehicle body 2. Therefore, it is possible to surely discharge the static electricity through the earth during the oil-filling operation. In other words, static electricity is discharged to the vehicle body via the fuel lid, the hinge, the adaptor, the electrically conductive packing, and the capless mechanism.

As described above, the fuel lid part structure includes the fuel lid 5 supported to the vehicle body 2 with the hinge 6 interposed therebetween; the vehicle-body concave portion 4 covered by the fuel lid 5 so as to be openable or closable; the filler opening 3 provided in the vehicle-body concave portion 4; and the capless mechanism 15 provided in the filler opening 3 so that the oil-filling operation which does not need attaching and detaching of the fuel cap is carried out. The fuel lid part structure is provided with the conductive passage from the fuel lid 5 to the vehicle body 2.

According to the above-described configuration, when the fuel lid 5 is manually opened by a hand after releasing the locking of the fuel lid 5, the static electricity charged to the body of the oil-filling operator is discharged to the vehicle body 2. Accordingly, even when using the capless mechanism 15 which does not need attaching and detaching of the fuel cap, it is possible to surely discharge the static electricity charged to the body of the oil-filling operator through the earth.

In the above fuel lid part structure, the fuel lid 5 is formed of the conductive resin and the fuel lid 5 is formed of resin which has a good formability, it is possible to surely discharge the static electricity through the earth during the oil-filling operation.

In the above fuel lid part structure, the adaptor 9 provided with the vehicle-body concave portion 4 is formed so as to be separated from the vehicle body 2, and the adaptor 9 is formed of the conductive resin which has a good formability, the adaptor 9 being formed of resin to be easily formed. Therefore the adaptor 9 and the fuel lid 5 form into an assembly, and it is possible to discharge the static electricity through the earth during the oil-filling operation.

Further, in the above fuel lid part structure, since the packing 23 interposed between the filler opening 3 and the adaptor 9 has an electrical conductivity, it is possible to maintain the filler opening 3 and the vehicle body 2 at the same potential via the packing 23, and it is possible to more surely discharge the static electricity through the earth.

The above-described embodiment is an example of the present invention, and other modifications can be made without departing from the spirit or scope of the present invention. For example, in a case where the fuel lid is not conductive or the steel fuel lid having a coating is not conductive, the hinge is formed of conductive resin or metal and the hinge extends to the rear-surface end portion of the fuel lid. Accordingly, it is possible to discharge the static electricity charged to the body of the oil-filling operator through the earth to the vehicle body when the fuel lid is opened. In this case, the extension portion of the hinge is a part of the fuel lid.

INDUSTRIAL APPLICABILITY

According to the fuel lid part structure of the present invention, even when using the capless mechanism which does not need attaching and detaching of the fuel cap, it is possible to surely discharge the static electricity charged to the body of the oil-filling operator through an earth.

The invention claimed is:

1. A fuel lid part structure comprising:
a fuel lid which is supported to a vehicle body with a hinge interposed therebetween;
a substantially cup-shaped adaptor having a concave opening formed therein which is covered by the fuel lid so as to be openable or closable, the adaptor formed from an electrically conductive material and comprising a main body portion having an outer edge with a flange portion extending therearound, the flange portion adapted to be connected to a step portion of the vehicle body, and a bottom portion having a through-hole formed therein defining a filler opening;
and
a capless mechanism which is provided in the filler opening so as to perform an oil-filling operation which does not need attaching and detaching of a fuel cap, an electrically conductive packing interposed between the filler opening and the capless mechanism,
wherein an electrically conductive passage is provided from the fuel lid to the vehicle body and
wherein static electricity is discharged to the vehicle body via the fuel lid, the hinge, the adaptor, the electrically conductive packing, and the capless mechanism.

2. The fuel lid part structure according to claim 1, wherein at least a rear-surface end portion of the fuel lid is formed of an electrically conductive resin.

3. The fuel lid part structure according to claim 1, wherein the adaptor is formed so as to be separable from the vehicle body, and
the electrically conductive material is an electrically conductive resin.

4. The fuel lid part structure according to claim 2, wherein the adaptor is formed so as to be separable from the vehicle body, and
the electrically conductive material is an electrically conductive resin.

5. The fuel lid part structure according to claim 1, wherein the capless mechanism includes
a cylindrical main body fitted to a front end portion of a tubular filler neck extending from a fuel tank, and
an inner lid rotatably supported to an inside of the cylindrical main body via a hinge shaft which is perpendicular to an axis of the cylindrical main body, and
wherein the inner lid closely contacts with a peripheral portion of a front-end opening of the cylindrical main body from the inside of the cylindrical main body by a predetermined force by the hinge shaft.

* * * * *